(12) United States Patent
Blaurock et al.

(10) Patent No.: US 6,698,301 B2
(45) Date of Patent: Mar. 2, 2004

(54) SCREW DRIVE WITH ROLLING ELEMENTS, AND METHOD OF ASSEMBLY

(75) Inventors: Werner Blaurock, Niederwern (DE); Roland Greubel, Ramsthal (DE); Hugo Och, Rottendorf (DE); Peter Blattner, Dingolshausen (DE); Erich Huppman, Sömmersdorf (DE)

(73) Assignee: Rexroth Star GmbH, Schweinfurt (DE)

( * ) Notice: Subject to any disclaimer, the term of this patent is extended or adjusted under 35 U.S.C. 154(b) by 122 days.

(21) Appl. No.: 09/978,450

(22) Filed: Oct. 17, 2001

(65) Prior Publication Data

US 2002/0017154 A1 Feb. 14, 2002

Related U.S. Application Data

(63) Continuation-in-part of application No. 09/783,468, filed on Feb. 14, 2001, now abandoned, and a continuation-in-part of application No. 09/473,493, filed on Dec. 28, 1999, now Pat. No. 6,321,614.

(30) Foreign Application Priority Data

Dec. 29, 1998 (DE) .......................................... 198 60 643
Feb. 15, 2000 (DE) .......................................... 100 06 536

(51) Int. Cl.[7] ............................................... F16H 27/02
(52) U.S. Cl. .................................................... 74/89.42
(58) Field of Search ........................... 74/424.72, 89.42, 74/441, 440, 509

(56) References Cited

U.S. PATENT DOCUMENTS

| 3,851,541 | A | * | 12/1974 | Ploss et al. ................. 74/89.42 |
| 4,564,993 | A |   | 1/1986  | Blaurock et al. |
| 4,896,552 | A | * | 1/1990  | Virga ........................ 74/89.42 |
| 5,263,381 | A |   | 11/1993 | Shirai |
| 5,644,951 | A | * | 7/1997  | Hatamura ................... 74/89.42 |
| 5,697,252 | A | * | 12/1997 | Yamaguchi et al. .......... 74/441 |
| 6,119,541 | A | * | 9/2000  | Robinson .................... 74/441 |
| 6,131,478 | A | * | 10/2000 | Erikson et al. ............... 74/441 |
| 6,202,500 | B1| * | 3/2001  | Erikson et al. ............. 74/89.42 |

FOREIGN PATENT DOCUMENTS

| DE | 2135812   | 1/1973  |
| DE | 2349958   | 4/1974  |
| DE | 2453635   | 5/1975  |
| DE | 2533996   | 2/1977  |
| DE | 7708184   | 7/1977  |
| DE | 2940762   | 4/1981  |
| DE | 3038774   | 7/1982  |
| DE | 3207566   | 9/1983  |
| DE | 3502582   | 4/1987  |
| DE | 3700693   | 7/1988  |
| DE | 4208126   | 9/1992  |
| DE | 19860643  | 7/2000  |
| EP | 049903    | 1/1985  |
| FR | 2394724   | 1/1979  |
| JP | 09264395  | 10/1997 |

* cited by examiner

Primary Examiner—David Fenstermacher
(74) Attorney, Agent, or Firm—Baker Botts L.L.P.

(57) ABSTRACT

A screw drive with rolling elements, optionally a ball screw drive, includes a screw spindle with a spindle axis and a double nut running on the screw spindle, with two separately formed single nuts which are substantially rigidly joined in the direction of the axis of the spindle. In order to set a desired play or bias relative to the screw spindle, the two single nuts can be turned continuously about the axis of the spindle relative to each other and fixed in any relative rotary position corresponding to the desired play or bias. According to the invention, a first of the two single nuts or an intermediate element joined thereto and arranged between the two single nuts has at least one peripheral section pressed into an associated aperture in one of the single nuts. In one embodiment, the intermediate element is an annular disk that is arranged orthogonally to the spindle axis.

28 Claims, 8 Drawing Sheets

SCREW DRIVE WITH ROLLING ELEMENTS, AND METHOD OF ASSEMBLY

CROSS REFERENCE TO RELATED APPLICATIONS

This is a continuation-in-part of U.S. patent application Ser. No. 09/473,493, now U.S. Pat. No. 6,321,614, filed Dec. 28, 1999, issued Nov. 27, 2001, and U.S. patent application Ser. No. 09/783,468, now abandoned, filed Feb. 14, 2001, the disclosures of which are hereby fully incorporated by reference.

BACKGROUND OF INVENTION

The invention relates to a screw drive with rolling elements and, more particularly, to a ball screw drive including a screw spindle with a spindle axis and a double nut running on the screw spindle with two separately formed single nuts which are substantially rigidly joined in the direction of the axis of the spindle. In order to set a desired play or bias relative to the screw spindle, the two single nuts can be turned continuously about the axis of the spindle relative to each other and fixed in any relative rotary position corresponding to the desired play or bias.

The Prior Art

Screw drives of the foregoing type are used, for example, for rapid and accurate positioning of tool and work holders and for moving them at defined speeds. Rotary motion of the screw spindle is converted to linear motion of the guided double nut. In order to satisfy the highest possible demands for accuracy in reversing the direction of motion of the double nut, the double nut has to be arranged on the spindle as far as possible without play. For this purpose, when the two nuts are being mounted on the spindle they are turned towards each other far enough to make their facing end surfaces bear against each other. Further turning of the nuts causes the rolling elements to be applied to opposing side surfaces of the raceways of the nuts, which ultimately results in the desired biasing of the two nuts relative to the screw spindle and guidance of the double nut on the spindle substantially without play.

A screw drive of the above type, i.e., a screw drive in which the play or bias of the two single nuts relative to the screw spindle can be infinitely (steplessly) adjusted, is known, for example, from DE-OS 21 35 812. A screw bolt is contained in an intermediate element of the known screw drive which is non-rotatably joined to one of the single nuts, the screw bolt being in screw engagement with a part mounted non-rotatably on the other single nut. The worm drive thus formed allows infinitely variable turning of the two single nuts relative to each other about the axis of the spindle. One disadvantage of this construction is that a relatively large amount of space has to be provided for the worm drive, particularly in a radial direction. Another disadvantage is that, in spite of the self-locking inherent in worm drives, the desired bias set may undesirably re-adjust itself, for example, due to vibrations, causing the screw bolt of the worm drive to turn.

A similarly constructed screw drive is known from DE-OS 23 49 958.

Versions of the generic screw drive are known from DE-OS 23 49 958 and from DE 30 38 774 C2 and the corresponding EP 0 049 903 B1 in which an intermediate element is in frictional engagement with both single nuts in order to prevent relative rotation between them. The frictional forces must therefore be overcome during the assembly, i.e., the relative turning of the two single nuts to set the desired bias or play. This makes exact setting of the play or bias to the desired value considerably more difficult.

Screw drives are further known from DE 24 53 635 C3, DE-OS 25 33 996 and DE 29 40 762 C2 in which the two single nuts can only be turned relative to each other and fixed in predetermined angular steps rather than infinitely variably.

In the screw drive known from German Utility Model 77 08 184, infinitely variable turning of the two single nuts is only possible within a very narrow angular range. In order to set a desired bias or play relative to the screw spindle, it is therefore also necessary to provide spacers between the two nuts, and their thickness must be determined by the desired bias or play. Hence, even with experienced operators it is usually necessary to change the spacers several times during assembly, until the spacer with the right thickness for the desired bias or play has been found. Assembly of the screw drive known from DE-GM 77 08 184 is therefore laborious and time consuming.

In DE 39 00 693 C2, a cavity formed by annular grooves and indentations between the two touching end faces of the single nuts is filled with casting compound to form the intermediate element. The position of relative rotation of the two single nuts corresponding to the desired bias or play must therefore be maintained until the casting compound has completely hardened.

A screw drive where the two single nuts are joined by an intermediate element which yields resiliently in the direction of the axis of the spindle is known from DE 42 08 126 A1. An axially resilient arrangement of this type has the drawback that, when a force exceeding the spring force is exerted on one of the single nuts, the two single nuts may move towards each other, thereby losing the desired bias.

In DE 32 07 566 A1, after the desired bias of the two single nuts has been set, a hole to receive a radial locking bolt is formed in their common contact region, to ensure that the bias obtained is maintained.

SUMMARY OF THE INVENTION

An object of the invention, therefore, is to provide a rolling-body screw drive of the above-mentioned type which, with a straightforward construction and straightforward assembly sequence, readily enables the play or bias of the single nuts relative to the screw spindle to be adjusted and set in a stepless and precise manner to a desired value.

According to the invention, the foregoing object is attained by the provision of a screw drive of the above type, in which either a first of the two single nuts or an intermediate element joined thereto and arranged between the two single nuts has at least one peripheral section pressed into an associated aperture in the second single nut. In accordance with the invention, the non-rotational joining of the first single nut or the intermediate element to the second single nut is the last operation in assembling the screw drive according to the invention. The possibly necessary non-rotational joining of the intermediate element to the first single nut or the formation of the intermediate element on the first single nut may take place in a preceding operation or simultaneously with the non-rotational joining of the intermediate element to the second single nut.

The limit between direct joining of the two single nuts and joining an intermediate element integral with one of them to the other single nut is a fluid transition in practice. It is not always possible to decide which of the two extreme cases applies. Basically any part of the single nut used for joining the other single nut may be considered as an intermediate element, even when that intermediate element is not a separately formed part of the single nut in question.

In order to join the two single nuts or the intermediate element non-rotatably to the second single nut, the latter is first brought into contact with the first single nut or the intermediate element by turning on the screw spindle. The desired play or bias of the two single nuts relative to the screw spindle is then set by further turning of the nuts. The only frictional forces arising between the intermediate element and the nut emanate from the actual bias. When the play or bias has reached the desired value, a peripheral section of the first single nut or of the intermediate element is then pressed into an associated aperture in the second single nut. A secure, non-rotational joint is thus obtained, allowing immediate further processing of the screw drive. Subsequent accidental turning of the two single nuts relative to each other, with resultant re-adjustment of the desired play or bias, is reliably avoided.

In accordance with the invention, the peripheral section may be pressed into the aperture in the second single nut in an axial or/and radial direction. It is then advantageous for the peripheral section which is pressed in to bear on the wall surfaces bounding the aperture only in a peripheral direction. In this way, one can reliably avoid forces acting in either an axial or a radial direction that might influence the bias or play of the two single nuts relative to the screw spindle.

In order to reduce the impressing forces required or/and to enable the peripheral section pressed in to be applied to the side walls of the aperture over the largest possible area, provision may further be made for the peripheral section which is pressed in to be indented.

To increase the stability of the whole arrangement and thus reduce the risk of deformation of the nuts, particularly in their end regions facing towards each other, the aperture may be bounded radially inwardly by a wall section of the second single nut.

In certain applications it may be advantageous for the first single nut or the intermediate element to be additionally adhered to the second single nut, preferably using a double-sided adhesive tape. Adhesive tapes with curing synthetic resins suitable for this application are obtainable, for example, under the name of SCOTCH™ VHB™.

Also, the second single nut may clearly be joined to the first single nut or the intermediate element by means of a plurality of sections of the first single nut or intermediate element pressed into apertures in the second single nut spread over the whole periphery.

There are various possible ways of joining the intermediate element to the first single nut. Thus, the intermediate element may both be integral with the first single nut and an element separate from that nut. In the first case, a particularly stable non-rotational connection is obtained between the intermediate element and the first single nut, although it makes it difficult to dismantle the double nut of the screw drive on the screw spindle without breaking it.

For example, the intermediate element may be joined to the first single nut with a press fit. Additionally or alternatively, the intermediate element may be adhered to the first single nut, preferably using a double-sided adhesive tape, as already mentioned for joining the intermediate element to the second single nut.

To obtain a positive connection between the intermediate element and the first single nut, the intermediate element may be held non-rotatably relative to the first single nut by at least one additional fit component, which is joined to or integral with one of the two components, i.e., the intermediate element or the first single nut, and which in either case engages in an aperture provided in the other component, the first single nut or the intermediate element.

In a first alternative form of the positive connection, the additional fit component may be formed by a peripheral section of the intermediate element which is pressed into an aperture in the first single nut. In a second alternative form, it is also possible for the additional fit component to be a separate component and to be fixed detachably to the first single nut, for example, by being screwed onto it by means of a screw bolt. The advantages of these two alternative joining methods may be seen from the above discussion of the various ways of joining the intermediate element to the second single nut. In particular, if an additional fit component which can be screwed onto the first single nut is used, it is then possible for the inside diameter of the hole passing through the additional fit component to be larger than the outside diameter of the screw bolt, and for the hole to be provided with an internal screw thread.

Another possible way of joining the first single nut to the intermediate element is to have a plurality of additional fit components distributed around the whole periphery.

Another method of joining the intermediate element to the first single nut is to screw it onto or into the nut, for example, by means of a fine thread. The decisive factor in making the joint between the intermediate element and the first single nut non-rotational in operation is that the pitch and/or rotary direction of the screw connection between them should be different from those of the screw spindle.

To facilitate reproducible and accurate assembly of the screw drive according to the invention it is proposed, in a further embodiment, that the intermediate element on at least one of the single nuts, and preferably both single nuts, be arranged centered in respect of the axis of the spindle, or that the two single nuts be arranged centered relative to each other in respect of the axis of the spindle.

To increase the stability of the screw drive but also to ensure high-precision manufacture, it is further proposed that the intermediate element should be formed by a closed ring member.

Further according to the invention, at least one of two components to be joined, i.e., the first single nut or intermediate element, or the second single nut or intermediate element, or one of the two single nuts, may be made of soft, i.e., non-hardened, steel at least in a region determined for joining to the respective other component. These soft regions may also be treated in a simple manner by the end user. For example, tapped holes may be made in these soft regions with ordinary commercial tools, allowing highly flexible installation of screw drives according to the invention in higher-level structures. Moreover, the soft regions of one component may be pressed into associated apertures in the other, to join the two components.

The use of case-hardened single nuts is nevertheless not excluded. The provision of at least one case-hardened single nut may be appropriate, e.g., when the intermediate element is integral with one of the two single nuts and the nut is to be joined to the other single nut by pressing in. In a case-hardened single nut for this purpose, the region to be pressed in is not carburised. Apart from case-hardening, the spindle raceways of the single nuts may also be induction hardened. This method, in which the steel to be hardened is merely induction heated instead of having carbon supplied to it, is particularly suitable for use in single nuts made entirely of carbon-rich steel. Owing to the high carbon content of the outer surface region surrounding the spindle raceway, induction hardened single nuts cannot be welded directly together. However, the outer surface region remains soft in the induction hardening process, so the single nuts can be joined by the pressing-in method described above.

In an advantageous embodiment of the invention, the intermediate element comprises an annular disk, which is connected to the first of the two individual nuts and which is arranged between the two individual nuts and has its disk plane running essentially orthogonally to the spindle axis. At least one circumferential section of the disk is pressed into an associated recess of the second individual nut. This solution has the further advantage that it only requires a small amount of space, even in the axial direction, for arranging the annular disk between the two individual nuts.

During the assembly of the rolling-body screw drive according to this embodiment, the rotationally fixed connection of the annular disk to the second individual nut may, according to a first method variant, be the last operation. For this purpose, the second individual nut is first of all brought into abutment, by rotation on the threaded spindle, against the annular disk, which is already connected to the first individual nut in a rotationally fixed manner. Further rotation of the two individual nuts then sets the desired level of play or the desired prestressing of the two individual nuts in relation to the threaded spindles. The only frictional forces occurring here between the annular disk and the nut stem from the prestressing itself. If the level of play or the prestressing has reached the desired value, at least one circumferential section of the annular disk is pressed into an associated recess of the second individual nut. This achieves a secure rotationally fixed connection which allows immediate further processing of the rolling-body screw drive. In addition, subsequent unintentional rotation of the two individual nuts relative to one another, with resulting adjustment of the desired level of play or of the desired prestressing, is reliably ruled out.

In order to simplify the assembly steps necessary for assembling the rolling-body screw drive according to this embodiment, it is also possible for the rotationally fixed connection of the annular disk to the first individual nut to be carried out by virtue of at least one circumferential section of the annular disk being pressed into an associated recess of the first individual nut. According to the first method alternative mentioned above, it is possible here, before the at least one circumferential section is pressed in, for the annular disk to be centered relative to the first individual nut using a centering pin.

It is basically also possible however, according to a second method alternative, for the annular disk to be connected to the two individual nuts in a rotationally fixed manner at the same time, advantageously in both cases by virtue of at least one circumferential section of the annular disk being pressed into associated recesses of the two individual nuts. In this case, in order to simplify the assembly, it is conceivable for a centering extension for centering the annular disk to be provided on at least one of the individual nuts.

Irrespective of the method alternative which is used for assembly in each case, centering of the annular disk in relation to the first individual nut or in relation to both individual nuts has, quite generally, the advantage of facilitating the reproducible and precise assembly of the rolling-body screw drive according to the invention.

At most, during the assembly of the rolling-body screw drive according to the annular disk embodiment, there may be a problem if, when the desired prestressing or the desired level of play of the two individual nuts has been reached, two recesses of said individual nuts are located precisely opposite one another in the direction of the spindle axis. This is because the annular disk can only be connected in a form-fitting manner to one of the two individual nuts at a certain circumferential section. In order for it to be possible to remedy this, it is proposed that, when each of the individual nuts is connected to the annular disk at a predetermined number of circumferential sections, at least one of the individual nuts, preferably the second individual nut, has a larger number, preferably at least double the number, of recesses than corresponds to the predetermined number. In addition or as an alternative, it may nevertheless also be provided that, when an individual nut is provided with at least two recesses suitable for connection to the annular disk, such recesses are distributed irregularly over the circumference of the individual nut. Finally, this problem can also be addressed by providing annular disks of at least two different thicknesses and, when it is established in relation to one disk thickness that the recesses of the two individual nuts are located opposite one another, the disk thickness is exchanged for an annular disk of a different thickness. It goes without saying the other disk thickness has to be selected such that, with this disk thickness, the problem of recesses being located opposite one another does not arise.

The annular disk preferably consists of soft, i.e., non-hardened, steel and can thus be produced, for example, by punching from sheet steel which can be obtained cost-effectively. This has the advantage that the annular disk, as an inexpensive series-production part, can be destroyed without undue concern during the dismantling of the rolling-body screw drive and can be replaced by a new annular disk during the renewed assembly of the two individual nuts.

The two individual nuts may be, for example, case-hardened individual nuts, i.e., individual nuts of which the rolling-body running surface is hardened by carburizing— and thus has a high carbon content—and is enclosed by an outer casing region made of a softer steel with a low carbon content. Such case-hardened individual nuts have the advantage that the soft casing region can also be easily worked by end users. For example, threaded bores can be made in these soft casing regions even with commercially available tools, which allows high-flexibility installation of the rolling-body screw drives according to the invention in primary structures. Moreover, the soft regions can be pressed in to associated recesses of the primary structure. If at least the soft casing region is additionally produced from a weldable steel, that is to say, for example, from a steel with a low carbon content, then the rolling-body screw drive according to the invention may additionally be connected to the primary structure by welding. It is also basically possible, however, for the individual nuts to be induction-hardened. This hardening method, in which the steel which is to be hardened, rather being fed any carbon, is merely inductively heated, is suitable, in particular, for use with individual nuts which consist overall of high-carbon steel.

In a development of the invention, at least one circumferential section pressed into an associated recess is supported solely in the circumferential direction on that wall surface of the individual nut which bounds the recess. This reliably avoids forces which act both in the axial direction and in the radial direction and could influence the prestressing or the level of play of the two individual nuts in relation to the threaded spindle.

In order to reduce the forces necessary for the pressing-in operation and/or allow abutment of the pressed-in circumferential section against the largest possible surface area of the side walls of the recess, it may also be provided that the pressed-in circumferential section is indented.

In order to increase the stability of the overall arrangement, and thus to reduce the risk of deformation of the nuts, in particularly in the mutually facing end regions of the same, it may be provided that the at least one recess is bounded in the radially inward direction by a wall section of the associated individual nut.

In certain applications, it may be advantageous if the annular disk is additionally adhesively bonded to at least one of the two individual nuts, preferably using double-sided adhesive tape. Adhesive tapes with setting synthetic resins which are suitable for this application can be obtained, for example, under the name SCOTCH™ VHB™.

For as straightforward a construction as possible of the rolling-body screw drive according to the invention, it is also proposed that the two individual nuts be supported on one another in the direction of the spindle axis by means of the annular disk. It is basically also conceivable, however, for the two individual nuts to be supported directly on one another.

The invention further concerns a method of assembling a screw drive according to the invention, particularly a ball screw drive, wherein, in order to set a desired play or bias, the two single nuts are placed against each other by turning them on the screw spindle and are joined non-rotatably in a relative rotary position corresponding to the desired play or bias and wherein, in order to fix the relative rotary position of the two single nuts, the first of the two single nuts or an intermediate element joined thereto and arranged between the two single nuts has at least one peripheral section pressed into an associated aperture in the second single nut. The advantages of this method and its possible forms are described above in connection with the discussion of the screw drive according to the invention.

In all the embodiments discussed above, it is firstly possible for the two single nuts to bear directly on each other in the direction of the axis of the spindle. Alternatively, it is also possible for the two single nuts to bear on each other in the direction of the axis of the spindle by means of the intermediate element.

BRIEF DESCRIPTION OF THE DRAWINGS

The invention will now be further explained with reference to the embodiments shown in the accompanying drawings, in which.

DETAILED DESCRIPTION

Figure 1:
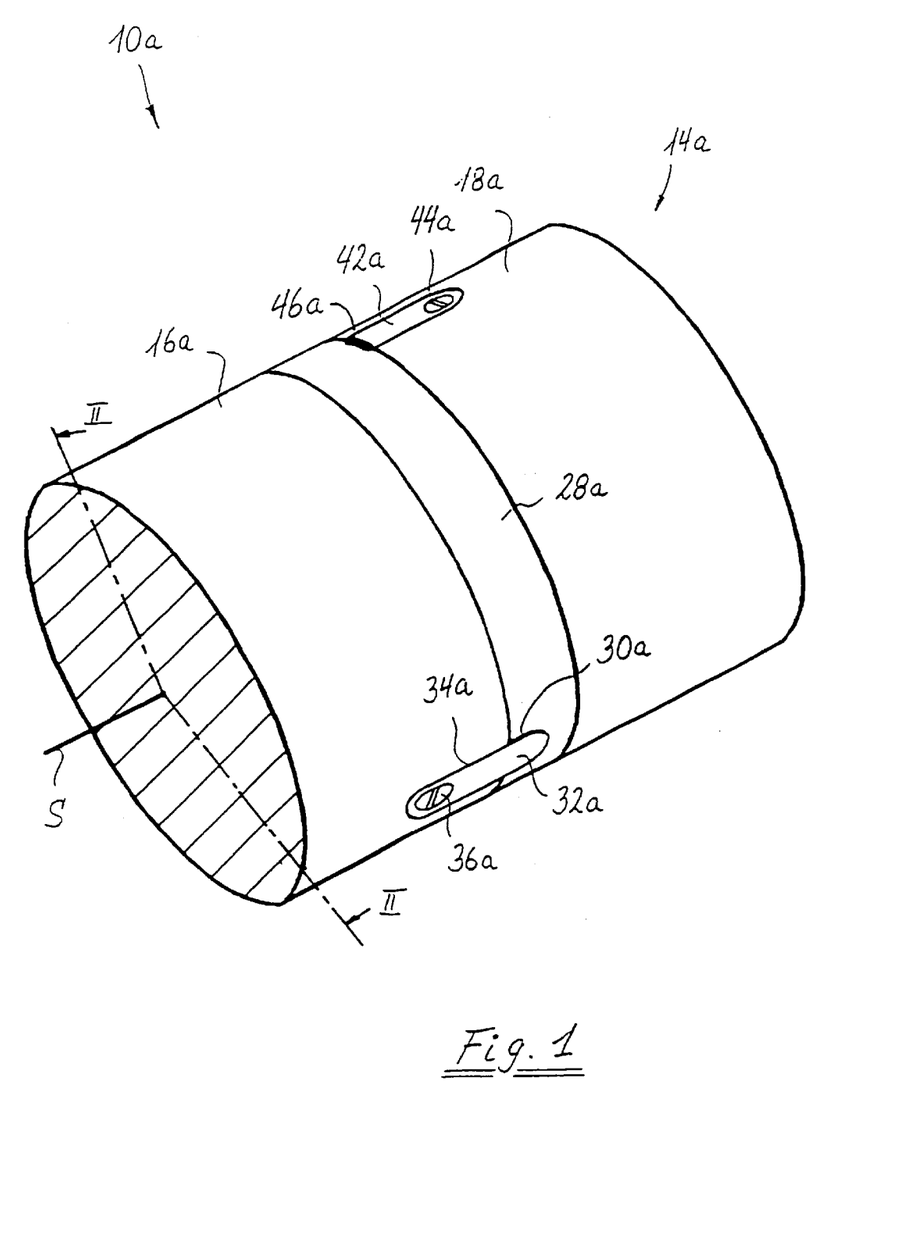
FIG. 1 is a perspective view of a first embodiment of a screw drive with rolling elements according to the invention.
Figure 2:
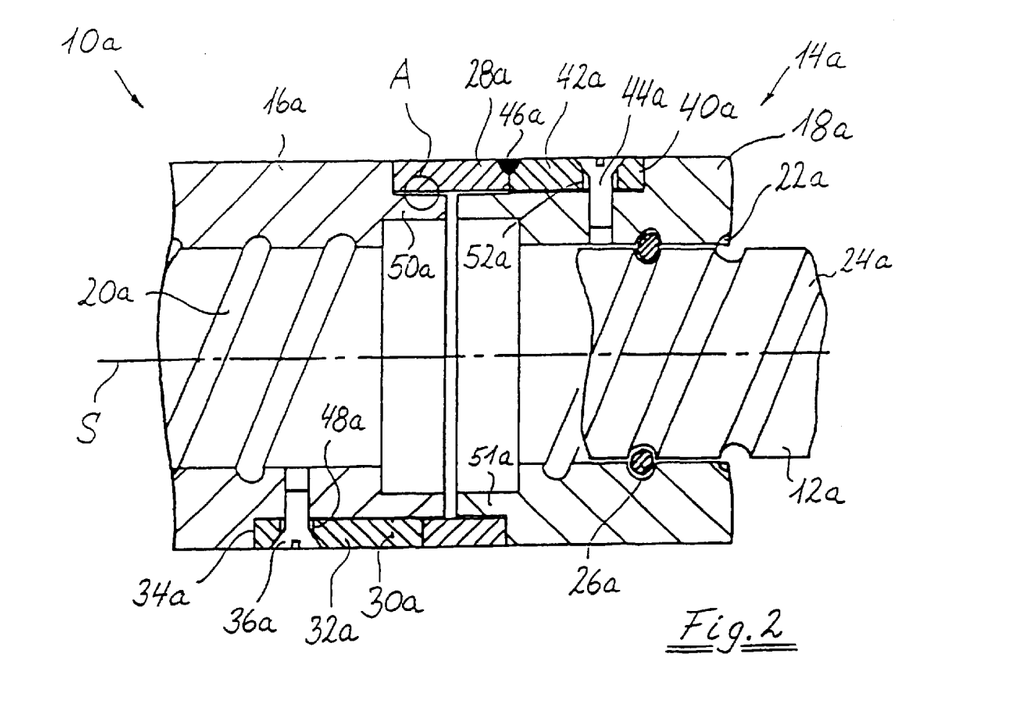
FIG. 2 is a sectional view of the screw drive with rolling elements in section along the line II—II in FIG. 1.

Referring to FIGS. 1 and 2, a screw drive with rolling elements is shown generally at 10a. The screw drive 10a includes a screw spindle 12a (see FIG. 2) with a spindle axis S and a double nut 14a arranged concentrically with the spindle 12a. The double nut 14a comprises a first single nut 16a and a second single nut 18a which are joined together non-rotatably in a manner to be explained below.

Rolling element raceways 20a and 22a in the two nuts 16a and 18a, together with a rolling element raceway 24a in the spindle 12a, form channels for rolling elements 26a. In a conventional manner—and hence not illustrated—the rolling element channels associated with the two nuts 16a and 18a are closed in on themselves by return channels formed in the generated surface of the nuts 16a, 18a, so that the rolling elements associated with the two nuts 16a, 18a— spheres in the embodiment illustrated—revolve endlessly in those channels. In this way, a rotary movement of the spindle 12a about the axis S is converted to a linear movement of the guided double nut 14a in the direction of the axis S.

To this extent, the screw drive 10a according to the invention corresponds to screw drives known from the prior art.

Screw drives of this type are used, for example, for rapid and accurate positioning of tool and work holders and for moving them at defined speeds. In order to satisfy the highest possible accuracy requirements when the direction of movement of the double nut 14a is reversed, the double nut 14a must run on the spindle 12a as far as possible without play. For this purpose, when the two nuts 16a and 18a are mounted on the spindle 12a they are rotated far enough towards each other to bring them into contact. If the nuts 16a and 18a are rotated further relative to each other, this causes the rolling elements 26a in the raceways 20a and 22a to be brought into contact with opposing side surfaces of the respective raceways 20a and 22a. As a result, the two nuts 16a and 18a are biased relative to the screw spindle 12a. Owing to this action of the rolling elements 28a on different side surfaces of the raceways 20a and 22a, the play between the double nut 14a and the spindle 12a is reduced if not completely eliminated. To prevent the bias described above from being removed by relative rotation of the two nuts 16a, 18a, the nuts are held non-rotatably together, namely by using an intermediate member 28a as is also known from prior art.

The present invention involves the manner of constructing the intermediate element and the way in which it is non-rotatably joined to the two single nuts.

The embodiments of FIGS. 1–6 utilize welds between the single nuts 16a, 18a or between the fit components 42a, etc. and the intermediate ring 28a, etc., in order to secure the nuts 16a, 18a in fixed rotational position relative to one another. Those embodiments are more fully described and claimed in copending, commonly-owned U.S. application Ser. No. 09/473,493, filed Dec. 28, 1999, of which the present application is a continuation-in-part. The description of FIGS. 1–6 is repeated here in part for background. The entirely of the disclosure of U.S. application Ser. No. 09/473,493 is hereby incorporated by reference for all purposes.

In the embodiment in FIGS. 1 and 2, the intermediate element is in the form of an intermediate ring 28a. The side of the ring 28a facing towards the nut 16a contains an aperture 30a into which a fit component 32a engages positively. (See FIG. 1) The fit component 32a is in turn received positively in a recess 34a in the nut 16a and fixed to the nut by means of a screw bolt 36a. A fit component 42a is similarly received positively in a recess 40a in the second nut 18a and held in the aperture 40a by means of a screw bolt 44a. Unlike the fit component 32a, the additional fit component 42a ends flush with the end surface of the nut 18a facing towards the intermediate ring 28a.

If the two nuts 16a and 18a are turned towards each other during the mounting of the screw drive 10a until they are in contact by means of the intermediate ring 28a, the fit component 42a also comes into contact with the ring 28a in the process. If the desired play or bias of the two nuts 16a, 18a relative to the spindle 12a is obtained through relative rotation of the two nuts, the fit component 42a and intermediate ring 28a are welded together along their line of contact 46a, and the relative rotary position of the two nuts 16a and 18a corresponding to the desired bias or play is thus secured.

In order to make the weld 46a, it is preferable for both the intermediate ring 28a and the fit component 42a to be made of a weldable material, e.g., steel with a low carbon content. The limit for the weldability of steel without pre- or post-treatment is usually given in the technical literature as a carbon content of 0.22%. In the embodiment in FIGS. 1 and 2, on the other hand, the two nuts 16a and 18a may be made of hard steel, i.e., a steel with a high carbon content.

The embodiment shown in FIGS. 1 and 2 may be dismantled undamaged on the screw spindle 12a and reassembled after servicing or repair. All that has to be done is to release the screw 36a then remove the fit component 32a from the recess 34a. The component 32a is consequently no longer in positive engagement with the ring 28a, so the nut 16a can be removed from the unit formed by the ring 28a and the second nut 18a by rotating it about the spindle axis S. To reassemble the screw drive 10a, the above steps are carried out in the reverse order. To facilitate dismantling of the fit component 32a, the hole 48a passing through it is provided with internal thread larger than the external thread on the screw bolt 36a. When the screw 36a has been removed, a larger-diameter screw can be driven into the thread 48a; this screw then bears on the nut 16a and levers the fit component 32a out of the aperture 34a.

It should also be mentioned that the intermediate ring 28a is held concentrically with the axis S of the spindle, both on a centering attachment 50a of the nut 16a and on a centering attachment 51a of the nut 18a. The ring 28a is held with a loose centering fit, i.e., a fit which facilitates relative rotation of the nuts 16a, 18a and intermediate ring 28a. This is shown diagrammatically at detail A in FIG. 2.

Figure 3:
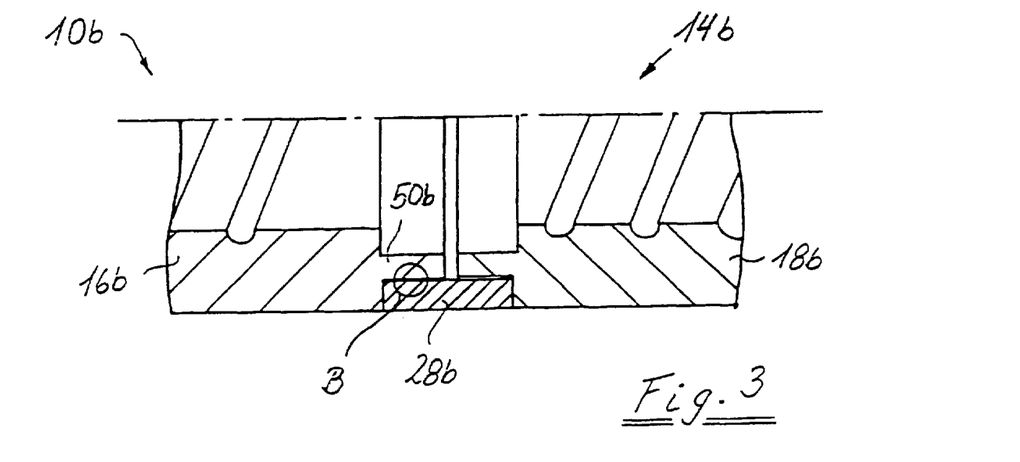
FIGS. 3–6 are views similar to FIG. 2 of further embodiments of screw drives according to the invention, in which welds are used to secure the nuts and/or the intermediate elements together.

FIG. 3 shows a further embodiment of a screw drive with rolling elements according to the invention, which differs from the embodiment in FIGS. 1 and 2 only in the way that the intermediate ring is non-rotatably fixed to the first nut. Similar parts in FIG. 3 therefore carry the same references as in FIGS. 1 and 2 but with the suffix "b" instead of the suffix "a". Moreover, the FIG. 3 embodiment will be described below only insofar as it differs from the embodiment in FIGS. 1 and 2.

In the screw drive 10b in FIG. 3, the intermediate ring 28b is fixed non-rotatably on the centering attachment 50b of the first nut 16b with a press fit, as shown diagrammatically at detail B in FIG. 3. Such a press fit can be obtained, e.g., by cooling the nut 16b and heating the intermediate ring 28b, placing the thermally expanded ring 28b on the centering attachment 50b of the thermally contracted nut 16b then equalising the temperature of the two parts, in other words by thermally "shrinking" the ring 28b onto the nut 16b.

The second nut 18b may be fixed to the intermediate ring 28b in the way described above for the embodiment in FIGS. 1 and 2. For this reason, FIG. 3 also shows only the lower half of the screw drive 10b.

The FIG. 3 embodiment cannot be dismantled undamaged on the screw spindle, as the first nut 16b cannot be turned relative to the intermediate ring 28b fixed to the second nut 18b owing to the press fit. In order to dismantle the screw drive 10b on the spindle, the fit component corresponding to the fit component 42a must be levered out of the associated aperture in the second nut 18b with the intermediate ring 28b, breaking the weld. To facilitate the levering out process, the hole passing through the fit component 42a has internal thread 52a, which is shaped and may be used in the same way as described for the internal thread 48a of the fit component 32a, as illustrated for the FIG. 2 embodiment. When the weld has been broken the unit formed by the first nut 16b and the intermediate ring 28b can be removed by relative rotation.

Alternatively, it is possible for the double nut 14b to be driven from the screw spindle onto a plain auxiliary spindle of smaller diameter and then—when the screw bolt corresponding to the screw bolt 44a has been released—for the second nut 18b to be removed in an axial direction from the unit formed by the first nut 16b and the intermediate ring 28b. The weld is not broken in the process, and once the double nut 14b has been remounted on the plain auxiliary spindle it can be returned to the screw spindle.

Figure 4:
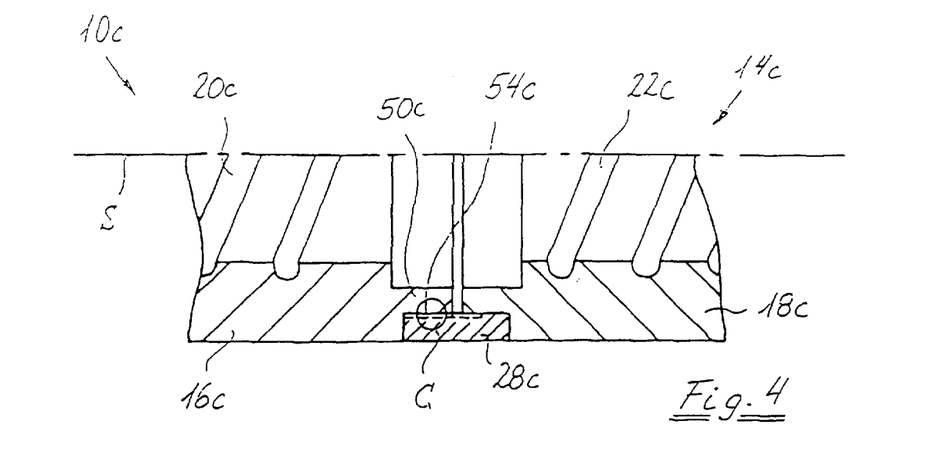

Another way of joining the intermediate element to the first nut is illustrated in FIG. 4. The FIG. 4 embodiment substantially corresponds to the embodiments in FIGS. 1 to 3. Similar parts therefore carry the same references as in the previous figures but with the suffix "c". Moreover, the FIG. 4 embodiment is only described below insofar as it differs from those in the previous figures.

As shown particularly at detail C, the intermediate ring 28c is screwed onto the attachment 50c of the first nut 16c by means of fine thread 54c. The fine thread 54c differs in pitch and/or screwing direction from the rolling element raceways 20c and 22c of the nuts 16c and 18c. Hence the connection between the ring 28c and the first nut 16c cannot be released in operation. Reference is made to the FIG. 3 embodiment for the assembling and dismantling of the double nut 14c of the screw drive 10c shown in FIG. 4.

Owing to the inherent properties of screw thread, the attachment 50c of the first nut 16c in the FIG. 4 embodiment cannot be used as an attachment for centering the intermediate ring 28c. To obtain a centering action all the same, an additional centering section, which springs back radially of the axis S of the spindle relative to the threaded section, might be provided on the attachment 50c, e.g., in addition to the threaded section shown in FIG. 4.

Figure 5:
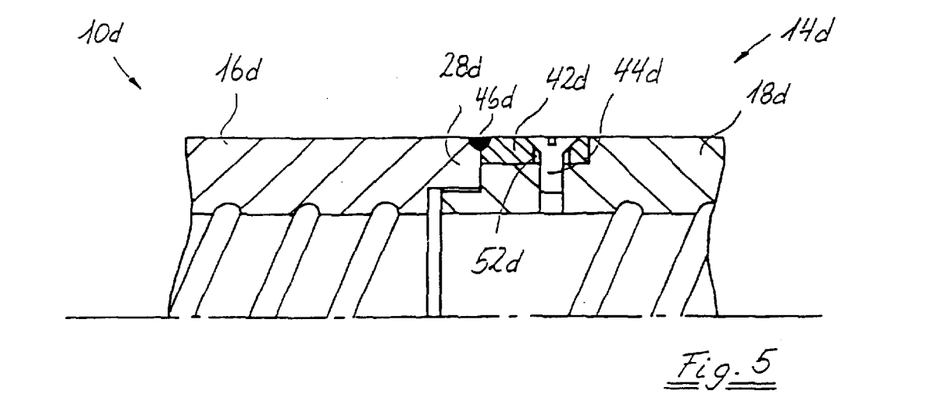

FIG. 5 shows a further embodiment of a screw drive with rolling elements according to the invention substantially corresponding to the embodiments described above. Similar parts in FIG. 5 therefore carry the same references as in the preceding figures but with the suffix "d". Moreover the FIG. 5 embodiment will only be described below insofar as it differs from the preceding embodiments.

In the screw drive 10d in FIG. 5, the intermediate ring 28d is integral with the first nut 16d, thereby reducing the number of parts required for the screw drive 10d. With regard to the joining of the second nut 18d to the first nut 16d or its intermediate ring section 28d, reference is made to the description of the FIG. 2 embodiment. As in that embodiment, a fit component 42d held to the nut 18d by means of a screw bolt 44d is joined to the intermediate ring section 28d of the first nut 16d by a weld 46d. As in the FIG. 2 embodiment, both nuts 16d and 18d may be made of hard steel, i.e., steel with a high carbon content, if only the fit component 42d is made of a weldable material, particularly a steel with a low carbon content. However, it is equally possible for the first nut 16d to be case hardened.

The double nut 14d of the screw drive 10d may be dismantled both on the screw spindle and on a plain auxiliary spindle simply by breaking the weld 46d. Reference is made to the discussion of this process in the FIG. 2 embodiment, not least in connection with the shape of the hole 52d passing through the fit component 42d.

Figure 6:
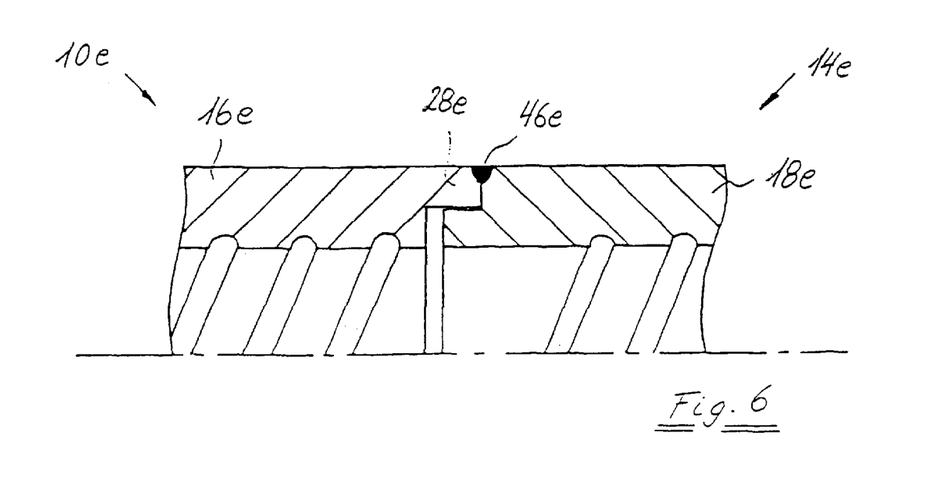

FIG. 6 shows a further embodiment of a screw drive with rolling elements according to the invention substantially corresponding to the embodiments described above. Similar parts in FIG. 6 therefore carry the same references as in the preceding figures but with the suffix "e". Moreover, the FIG. 6 embodiment will only be described below insofar as it differs from the preceding embodiments.

The double nut 14e of the screw drive 10e in FIG. 6 has the advantage, particularly over the FIG. 5 embodiment, that a minimum of parts is required for its assembly, namely only the two nuts 16e and 18e. As in the FIG. 5 embodiment the first nut 16e has an integral intermediate ring section 28e. This is joined to the second nut 18e by means of a weld 46e. For this purpose at least one of the two nuts 16e and 18e must be case hardened. The double nut 14e of the screw drive 10e in FIG. 6 can only be dismantled by costly removal of the weld 46e. However it is suitable particularly for applications with a low risk of damage owing to its cost-effective production and assembly.

Figure 7:
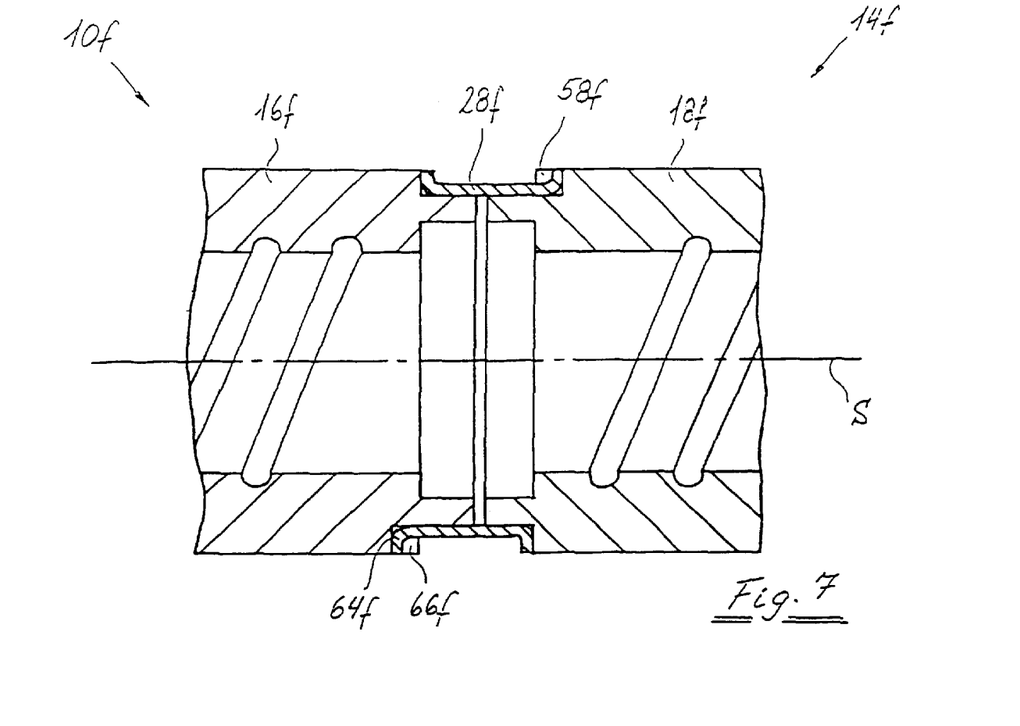
FIGS. 7, 9 and 10 are cross sectional views of further embodiments of the invention, in which one or more segments of the nuts and/or intermediate element are pressed into corresponding recesses to secure the components together.
Figure 8:
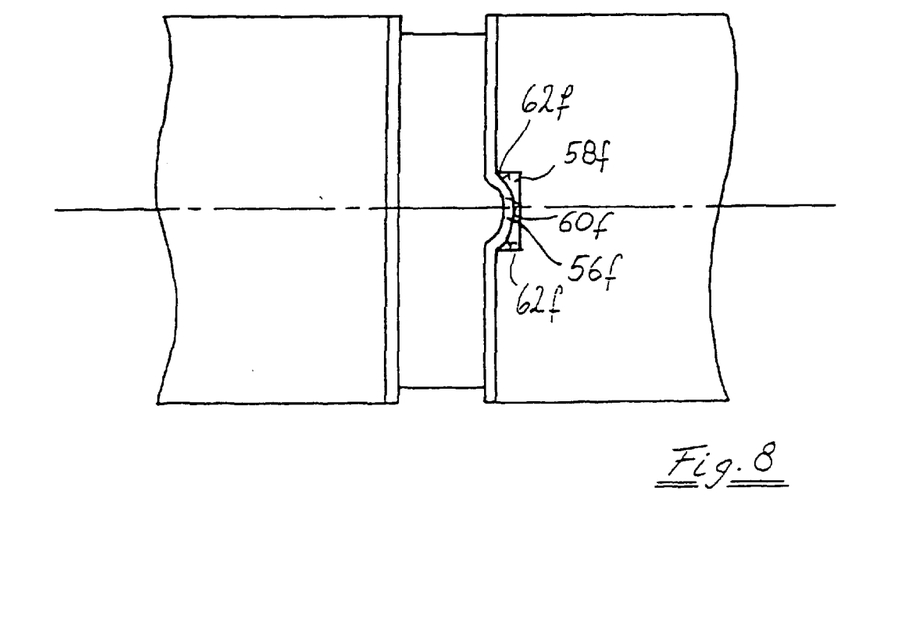
FIG. 8 is a plan view of the FIG. 7 screw drive.

FIGS. 7 and 8 show a further embodiment of a screw drive with rolling elements according to the invention substantially corresponding to the embodiments described above. Similar parts in FIGS. 7 and 8 therefore carry the same references as in the preceding figures but with the suffix "f". Moreover, the embodiment in FIGS. 7 and 8 will only be described below insofar as it differs from the preceding embodiments.

The main difference between the double nut 14f of the screw drive 10f in FIG. 7 and the previous embodiments is that the intermediate ring 28f joined to the first nut 16f is—after adjustment of the desired play or bias—joined to the second nut 18f or a part attached to it not by welding but by impressing or mortising a peripheral section 56f (see FIG. 8) of the intermediate ring 28f into an aperture 58f in the second nut 18f. The section 56f of the ring 58f may be impressed with the aid of appropriate supporting means and a plunger.

To prevent the biasing force of the two nuts 16f and 18f relative to the screw spindle from being affected by this kind of non-rotating connection between the intermediate ring 28f and the second nut 18f, the peripheral section 56f preferably bears not on the axial boundary surface 60f of the aperture 58f but only on the peripheral boundary surfaces 62f thereof (see FIG. 8). If necessary, the mortised or impressed peripheral section 56f may also be indented in locations corresponding to the peripheral boundary surfaces 62f, although this is not shown in either FIG. 7 or FIG. 8.

In the FIG. 7 embodiment, the intermediate ring 28f is additionally joined positively to the first nut 16f by mortising a peripheral section 64f into a recess 66f in the first nut. But it is basically also possible to resort to joining the intermediate ring 28f to the first nut 16f by a different method, e.g. one of the methods described in connection with FIGS. 2 to 4.

Figure 9:
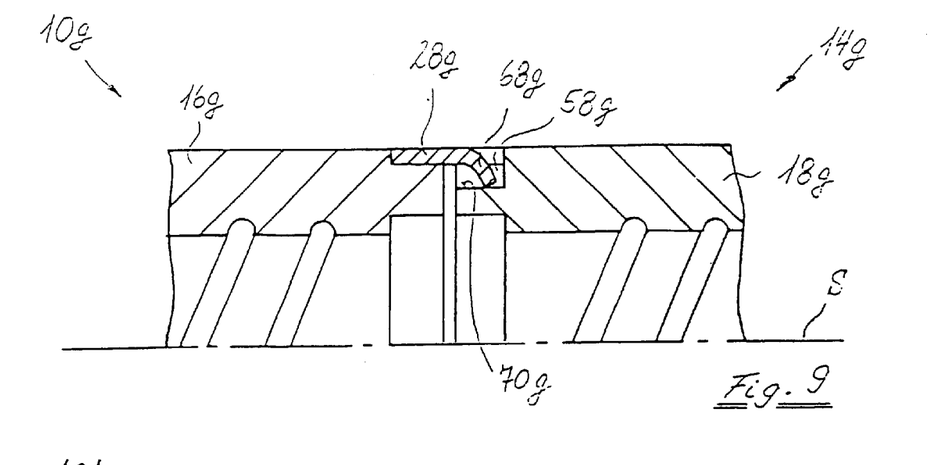

FIG. 9 shows a further embodiment of a screw drive with rolling elements according to the invention substantially corresponding to the embodiments described above. Similar parts in FIG. 9 therefore carry the same references as in the preceding figures but with the suffix "g". Moreover the FIG. 9 embodiment will only be described below insofar as it differs from the preceding embodiments.

The double nut 14g of the screw drive 10g in FIG. 9 differs from the embodiment illustrated in FIGS. 7 and 8 only in the feature that the peripheral section 68g of the intermediate ring 28g is joined to the aperture 58g of the second nut 18g by pressing it into the aperture not in an axial direction, i.e., in the direction of the axis S of the spindle, but in a radial direction, i.e., towards the axis S. To prevent this connection from affecting the centering of the two nuts 16g and 18g relative to the axis S of the spindle, the peripheral section 68g pressed in should bear not on the radial boundary surface 70g of the aperture 58g but only on its peripheral boundary surfaces. An effect on centering can be reliably excluded if the two nuts 16g and 18g interengage with a centering attachment and a centering aperture; however this is not illustrated in FIG. 9.

Figure 10:
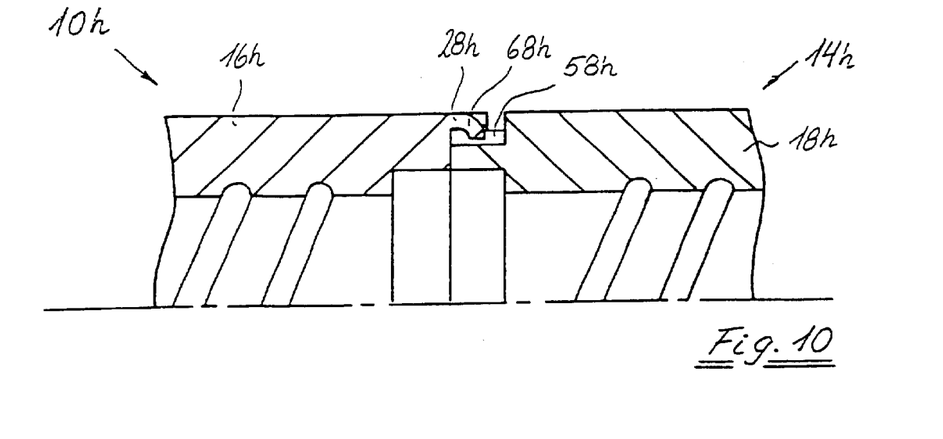

FIG. 10 shows a further embodiment of a screw drive with rolling elements according to the invention substantially corresponding to the embodiments described above. Similar parts in FIG. 10 therefore carry the same references as in the preceding figures but with the suffix "h". Moreover the FIG. 10 embodiment will only be described below insofar as it differs from the preceding embodiments.

In the double nut 14h of the screw drive 10h in FIG. 10, an intermediate ring section 28h is moulded integrally onto the first nut 16h. The two nuts 16h and 18h are joined nonrotatably by pressing a peripheral section 68h into an aperture in the second nut 18h in the same way as in the FIG. 9 embodiment. In this case, the nut 16h is preferably case hardened and made of a steel with a low carbon content, that is to say, a soft, relatively easily deformable steel, particularly in the region of the intermediate ring section 28h.

In connection with the embodiments in FIGS. 7 to 10, it should be added that the apertures into which the peripheral sections of the intermediate ring are pressed in an axial or radial direction advantageously do not continue to the inner peripheral surface of the nuts, so that weakening of the end region of the nuts is avoided and their adequate rigidity thus ensured.

Figure 11:
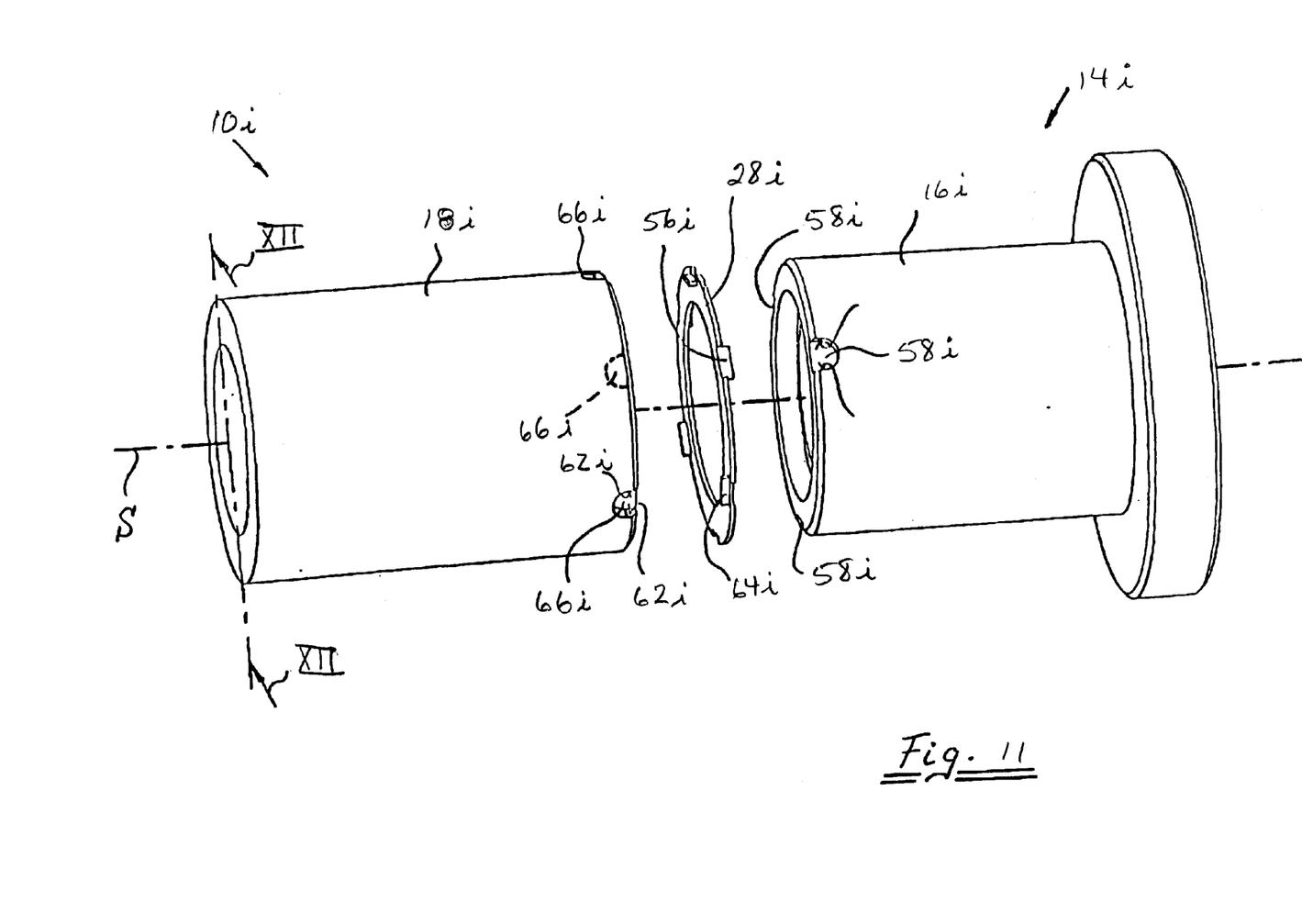
FIG. 11 is an exploded view of an embodiment of the invention having an annular disk as the intermediate member.
Figure 12:
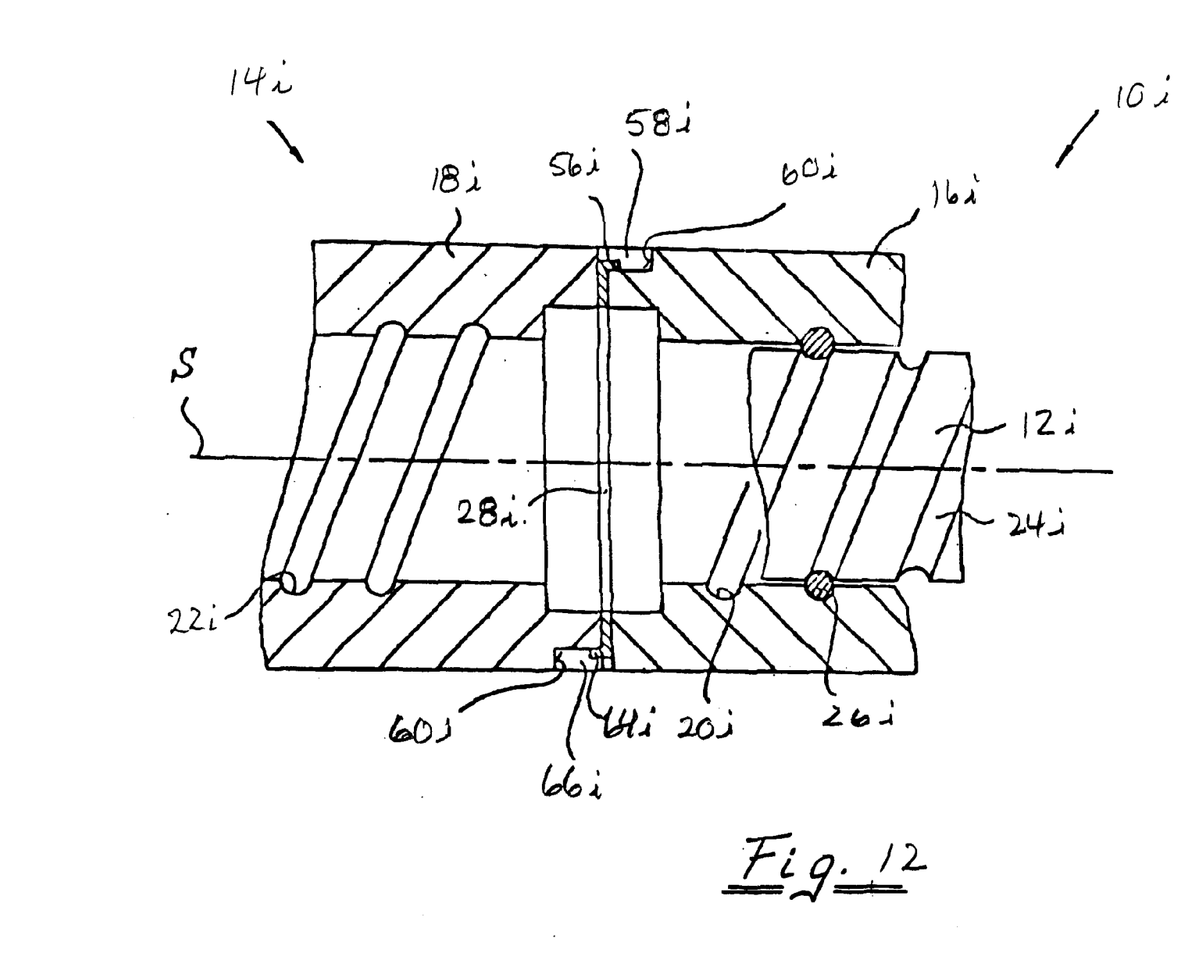
FIG. 12 is a partial sectional view taken along the line X—X of FIG. 11.
Figure 13:
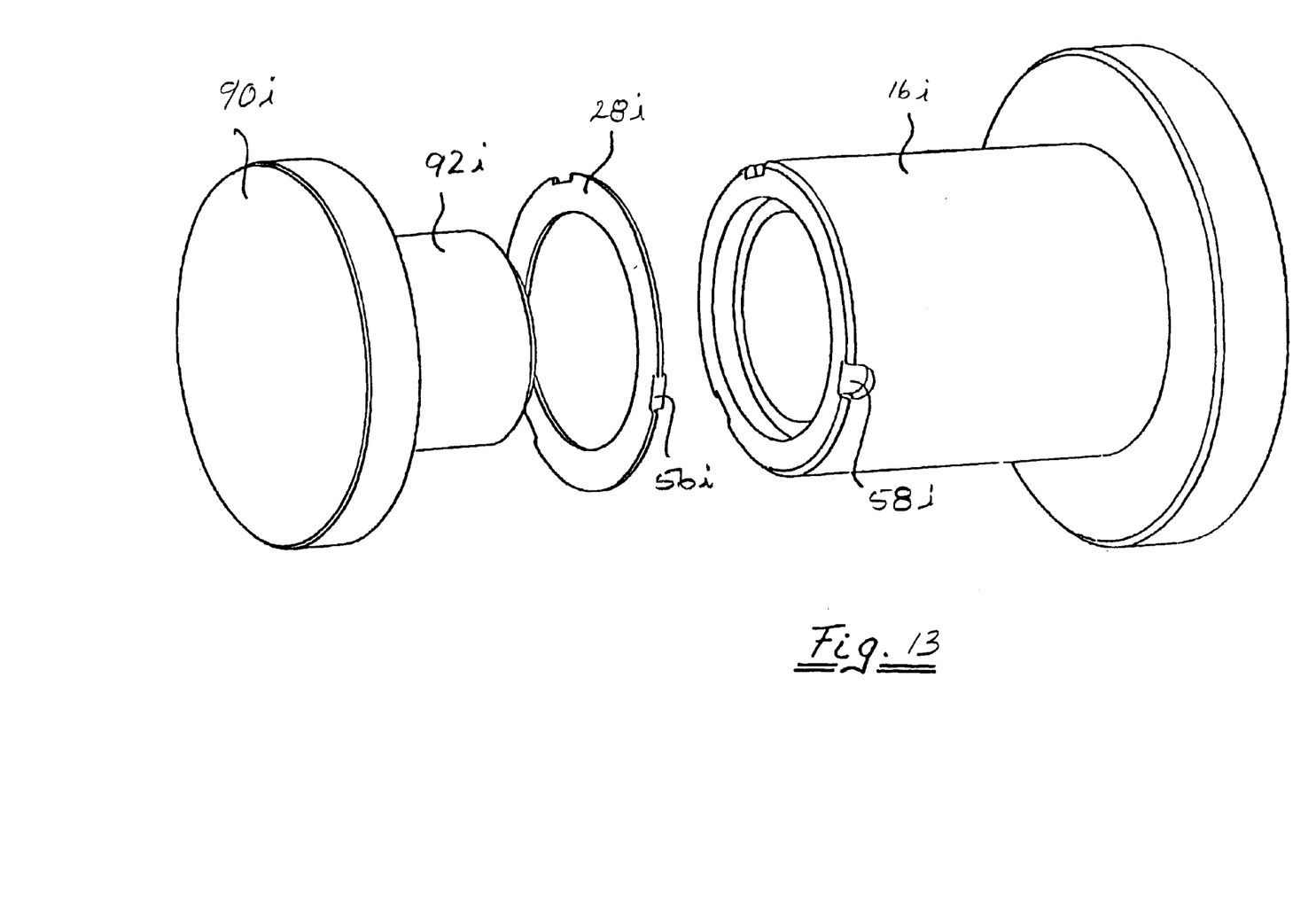
FIG. 13 is an exploded view illustrating the assembly of the embodiment of FIG. 11.

FIGS. 11–13 show a further embodiment of the invention which substantially corresponds, except as otherwise noted, to the foregoing embodiments. Similar parts in FIGS. 11–13, therefore, carry the same references as in the preceding figures but with the suffix "i". Moreover, the embodiment of FIGS. 11–13 is only described insofar as it differs from the preceding embodiments.

In this embodiment, the intermediate element comprises an annular disk 28i having a plurality of peripheral or circumferential sections 56i that are pressed or forced into cooperating recesses 58i of the first nut 16i and a plurality of circumferential sections 64i of the annular disk 28i that are pressed or forced into corresponding recesses 66i of the second nut 18i. For this purpose, the annular disk 28i is preferably produced from a soft steel, i.e., one which is not hardened and can be deformed, for example, with the aid of corresponding supporting means and of a ram or calking tool.

In order to avoid the situation where this manner of rotationally fixed connection influences the prestressing force of the two nuts 16i and 18i in relation to the threaded spindle 12i, it is preferred that, rather than being supported on the axial boundary surfaces 60i of the recesses 58i and 66i, the peripheral sections 56i, 64i are solely supported on the circumference boundary surfaces 62i of said recesses. If required, it is also possible for the forced-in or pressed-in peripheral sections 56i and 64i to be indented at locations corresponding to the circumference boundary surfaces 62i, although this is not illustrated either in FIG. 11 or in FIG. 12.

During assembly, it is possible, according to FIG. 13, for the annular disk 28i to be fitted, for example, first of all on the centering pin 92i of a centering tool 90i. Thereafter, the centering pin 92i is introduced into the first nut 16i, from that end region thereof which has the recesses 58i, whereupon the circumferential section 56i can be pressed or forced into the recesses 58i. This produces a circumferentially form-fitting, rotationally fixed connection between the annular disk 28i and the first nut 16i, which is centered in relation to the spindle axis S. The further connection of the resulting unit 16i/28i to the second nut 18i can take place analogously following rotation of the unit onto the threaded spindle 12i and setting of the desired level of play or of the desired prestressing between the two nuts 16i and 18i. The centering of the second nut 18a relative to the unit 16i/28i and relative to the spindle axis S is ensured hereby the threaded spindle 12i.

During the assembly explained above, it is unfortunately not possible to rule out the situation where the desired prestressing or the desired level of play is achieved precisely when the recesses 58i of the first nut 16i and the recesses 66i of the second nut 18i are located exactly opposite one another in the direction of the spindle axis S. This is problematic insofar as the annular disk 28i can only be connected in a form-fitting manner to one of the two individual nuts 16i and 18i at a certain circumferential section. In order to remedy this situation, according to the invention, at least one of the nuts is provided with a larger number of recesses than the respectively other nut. In the exemplary embodiment illustrated, the number of recesses 66i in the second nut 18i is double that of the recesses 58i in the first nut 16i. Only one of the additional recesses 66i is indicated by dashed lines in FIG. 11. In addition or as an alternative, the recesses of at least one of the nuts 16i, 18i may be distributed irregularly over the circumference of said nut.

In the embodiment of FIGS. 11 and 12, it is not possible for the double nut 14i to be dismantled from the threaded spindle 12i without being destroyed since, on account of the form-fitting engagement of the extensions 56i, 64i in the recesses 58i, 66i, neither of the two individual nuts 16i and 18i can be rotated relative to the annular disk 28i. In order for it to be possible for the rolling-body screw drive 10i to be dismantled from the spindle 12i, it would thus be necessary to destroy the extensions 56i or 64i on at least one of the sides of the annular disk.

It is more straightforward, however, for the double nut 14i to be dismantled using an auxiliary spindle with a smooth surface, which can be screwed into the double nut 14i instead of the threaded spindle 12i. Once the double nut 12i is located on said smooth auxiliary spindle, the two individual nuts 16i and 18i can readily be separated from one another, and from the annular disk 28i, in the axial direction, i.e. in the direction of the spindle axis S. This method of dismantling has the additional advantage that the annular disk 28i need not be destroyed and can be used again for renewed assembly.

Although the invention has been described herein by reference to specific embodiments thereof, it will be understood that such embodiments are susceptible of modification and variation without departing from the invention concepts disclosed. All such modifications and variations, therefore, are intended to be included within the spirit and scope of the appended claims.

What is claimed is:

1. A screw drive with rolling elements, comprising:
   a screw spindle with a spindle axis;
   a double nut running on the screw spindle with two separately formed single nuts which are substantially rigidly joined in the direction of the axis of the spindle, said two single nuts being rotatable continuously about the spindle axis relative to each other and fixed in a stepless manner in any relative rotary position corresponding to a desired bias relative to the screw spindle;
   an intermediate element joined to a first single nut, arranged between the two single nuts, and having at least one peripheral section pressed into an associated aperture in the second nut after the bias of the two single nuts has been adjusted to the desired setting by relative rotation of the first and second single nuts about the spindle axis.

2. A screw drive according to claim 1, wherein said peripheral section is pressed into said aperture in the second single nut in an axial direction.

3. A screw drive according to claim 1, wherein said peripheral section is pressed into said aperture in the second single nut in a radial direction.

4. A screw drive according to claim 2, wherein said peripheral section bears on the wall surfaces bounding said aperture only in a circumferential direction.

5. A screw drive according to claim 1, wherein said peripheral section is indented.

6. A screw drive according to claim 1, wherein said aperture is bounded radially inwardly by a wall section of the second single nut.

7. A screw drive according to claim 1, wherein the first single nut or the intermediate element is adhesively adhered to the second single nut.

8. A screw drive according to claim 7, wherein the first single nut or the intermediate element is adhered to the second single nut by a double-sided adhesive tape.

9. A screw drive according to claim 1, wherein the intermediate element is integral with the first single nut.

10. A screw drive according to claim 1, wherein the intermediate element is an element separate from the first single nut.

11. A screw drive according to claim 10, wherein the intermediate element is joined to the first single nut with a press fit.

12. A screw drive according to claim 8, wherein the intermediate element is adhered to the first single nut by a double-sided adhesive tape.

13. A screw drive according to claim 10, wherein the intermediate element is held non-rotatably relative to the first single nut by at least one fit component joined to or integral with one of the intermediate element and in engagement with an aperture provided in the other of the first single nut or the intermediate element.

14. A screw drive according to claim 13, wherein the at least one fit component is formed by a peripheral section of the intermediate element which is pressed into an aperture in the first single nut.

15. A screw drive according to claim 1, wherein the intermediate element or at least one of the single nuts is arranged centered in respect of the axis of the spindle, or wherein the two single nuts are arranged centered relative to each other in respect of the axis of the spindle.

16. A screw drive according to claim 1, wherein the intermediate element is formed by a closed ring member.

17. A method of assembling a screw drive according to claim 1, wherein:
(a) in order to set a desired bias, the two single nuts are placed against each other by turning them on the screw spindle and are joined non-rotatably in a relative rotary position corresponding to the desired bias; and
(b) in order to fix the relative rotary position of the two single nuts, the at least one peripheral section is pressed into said recess after the bias is set in accordance with step (a).

18. A screw drive according to claim 1, wherein the intermediate element comprises an annular disk which is connected to said first of the two single nuts and is arranged between the two single nuts and has its disk plane running essentially orthogonally to the spindle axis, is pressed, by way of said at least one peripheral section, into said associated recess of the second individual nut.

19. A screw drive according to claim 18, wherein the annular disk is also connected to the first single nut by at least one peripheral section being pressed into an associated recess of the first single nut.

20. A screw drive according to claim 18, wherein said at least one peripheral section pressed into said associated recess is supported solely in the circumferential direction on the wall surfaces bounding said recess.

21. A screw drive according to claim 18, wherein said at least one peripheral section pressed into an associated recess is indented.

22. A screw drive according to claim 18, wherein each of the single nuts is connected to the annular disk at a predetermined number of peripheral sections, at least one of the individual nuts has a larger number of recesses than corresponds to said predetermined number.

23. A screw drive according to claim 18, wherein at least one of the single nuts is provided with at least two recesses suitable for connection to the annular disk, said at least two recesses being distributed irregularly over the circumference of said at least one single nut.

24. A screw drive according to claim 18, wherein the two single nuts are supported on one another in the direction of the spindle axis by means of said annular disk.

25. A method of assembling a rolling-body screw drive according to claim 18, wherein:
to set a desired level of play or a desired prestressing, the two single nuts are brought into mutual abutment by rotation on the threaded spindle and are connected to one another in a rotationally fixed manner in a rotary position relative to one another corresponding to the desired level of play or the desired prestressing; and
to fix the rotary position of the two single nuts, relative to one another, the annular disk is arranged between the two single nuts and has its disk plane running essentially orthogonally to the spindle axis, is pressed, by way of said at least one peripheral section, into said associated recess of the second single nut.

26. The method according to claim 25, wherein the annular disk is connected to the first single nut by at least one circumferential section of the annular disk being pressed into an associated recess of the first single nut.

27. The method according to claim 26, wherein, before said at least one peripheral section is pressed in, the annular disk is centered relative to the first single nut using a centering pin.

28. The method according to claim 25, wherein at least two annular disks of different thicknesses are provided and, when it is established in relation to one of the annular disks that the recesses of the two individual nuts are located axially opposite one another, said one annular disk is exchanged for an annular disk of a different thickness.

* * * * *

UNITED STATES PATENT AND TRADEMARK OFFICE
CERTIFICATE OF CORRECTION

PATENT NO. : 6,698,301 B2
DATED : March 2, 2004
INVENTOR(S) : Blaurock et al.

It is certified that error appears in the above-identified patent and that said Letters Patent is hereby corrected as shown below:

<u>Title page,</u>
Item [56], References Cited, OTHER PUBLICATIONS, insert -- Patent Abstracts of Japan vol. 1998, no. 02, 30 January 1998

Signed and Sealed this

Seventeenth Day of August, 2004

JON W. DUDAS
*Acting Director of the United States Patent and Trademark Office*

UNITED STATES PATENT AND TRADEMARK OFFICE
CERTIFICATE OF CORRECTION

PATENT NO.    : 6,698,301 B2
DATED         : March 2, 2004
INVENTOR(S)   : Blaurock et al.

It is certified that error appears in the above-identified patent and that said Letters Patent is hereby corrected as shown below:

Title page,
Item [75], Inventors, "Niederwern" should read -- Niederwerrn --
Item [56], References Cited, OTHER PUBLICATIONS, insert -- Patent Abstracts of Japan vol. 1998, no. 02, 30 January 1998 (1998-01-30) --

Column 7,
Line 56, "cross sectional" should read -- cross-sectional --

Column 12,
Line 66, "calking" should read -- caulking --

Column 14,
Line 53, "claim 8," should read -- claim 18, --

Signed and Sealed this

Fourteenth Day of September, 2004

JON W. DUDAS
*Director of the United States Patent and Trademark Office*